US012641486B2

(12) United States Patent
Wigard et al.

(10) Patent No.: US 12,641,486 B2
(45) Date of Patent: May 26, 2026

(54) UPLINK DATA DUPLICATION AVOIDANCE

(71) Applicant: Nokia Technologies Oy, Espoo (FI)

(72) Inventors: Jeroen Wigard, Klarup (DK); Mads Lauridsen, Gistrup (DK); Srinivasan Selvaganapathy, Bangalore (IN); Frank Frederiksen, Klarup (DK); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 328 days.

(21) Appl. No.: 18/218,639

(22) Filed: Jul. 6, 2023

(65) Prior Publication Data

US 2024/0015594 A1 Jan. 11, 2024

(30) Foreign Application Priority Data

Jul. 11, 2022 (FI) ..................................... 20225652

(51) Int. Cl.
*H04W 28/14* (2009.01)
*H04L 1/08* (2006.01)

(52) U.S. Cl.
CPC ............... *H04W 28/14* (2013.01); *H04L 1/08* (2013.01)

(58) Field of Classification Search
CPC ......... H04W 28/14; H04L 1/08; H04L 1/1896
See application file for complete search history.

(56) References Cited

U.S. PATENT DOCUMENTS

| | | | | |
|---|---|---|---|---|
| 10,541,787 | B2 * | 1/2020 | Byun | .................... H04L 1/1896 |
| 11,968,674 | B2 * | 4/2024 | Meylan | ................. H04W 72/23 |
| 12,309,769 | B2 * | 5/2025 | Lu | ......................... H04W 72/23 |

(Continued)

FOREIGN PATENT DOCUMENTS

| | | |
|---|---|---|
| EP | 3 382 961 A2 | 10/2018 |
| WO | WO-2009/045945 A2 | 4/2009 |

(Continued)

OTHER PUBLICATIONS

"Tdoc R2-1913584 On remaining aspects on RLC and PDCP", Ericsson, 3GPP TSG-RAN WG2 #107bis, Oct. 2019, 7 pages.

(Continued)

*Primary Examiner* — Chandrahas B Patel

(74) *Attorney, Agent, or Firm* — Carter, DeLuca & Farrell LLP

(57) ABSTRACT

Embodiments of the present disclosure relate to devices, methods, apparatuses and computer readable storage media of UL data duplication avoidance. The method includes obtaining, from an application layer of a terminal device, at least one UL data to be transmitted to a network device, the at least one UL data including one or more application retransmission data and keeping the one or more application retransmission data in a buffer of the terminal device for respective time intervals. The method further includes in accordance with a determination that an indication, that respective acknowledges are received for at least a portion of application retransmission data in the one or more application retransmission data, is received from the application layer, removing the portion of application retransmission data from the buffer. In this way, redundant retransmission of UL application data may be avoided.

3 Claims, 4 Drawing Sheets

(56)                    References Cited

U.S. PATENT DOCUMENTS

| 2004/0030790 | A1  | 2/2004  | Le et al. ........................ 709/230 |
| 2017/0063499 | A1  | 3/2017  | Wang et al. |
| 2019/0349135 | A1  | 11/2019 | Xu et al. |
| 2020/0195383 | A1  | 6/2020  | Liu et al. |
| 2024/0172224 | A1* | 5/2024  | Xiong .................. H04W 72/21 |

FOREIGN PATENT DOCUMENTS

| WO | WO-2018/085209 | A1 | 5/2018 |
| WO | WO-2019/245443 | A2 | 12/2019 |

OTHER PUBLICATIONS

Alcatel-Lucent, "ULAM data confirmation based on HARQ ACK in LTE," 3GPP TSG RAN WG2 #59-bis, R2-074353, Oct. 8-12, 2007, Shanghai, China.

* cited by examiner

100

120-2

120-1

110

300

310

OBTAIN AT LEAST ONE UL DATA TO BE TRANSMITTED TO NETWORK DEVICE

320

KEEP ONE OR MORE APPLICATION RETRANSMISSION DATA IN BUFFER FOR RESPECTIVE TIME INTERVALS

330

INDICATION THAT RESPECTIVE ACKNOWLEDGES ARE RECEIVED IS FROM APPLICATION LAYER?

Y

340

REMOVE ONE OR MORE APPLICATION RETRANSMISSION DATA FROM BUFFER

UPLINK DATA DUPLICATION AVOIDANCE

FIELD

Embodiments of the present disclosure generally relate to the field of telecommunication and in particular to devices, methods, apparatuses and computer readable storage media of Uplink (UL) data duplication avoidance.

BACKGROUND

The Third Generation Partnership Project (3GPP) has initiated a study item on the support of the Narrow Band Internet of Things (NB-IoT)/enhanced Machine Type Communication (eMTC) over the Non-Terrestrial Networks (NTNs) in release 17. It is to be expected that this study item will be further developed.

SUMMARY

In general, example embodiments of the present disclosure provide a solution of UL data duplication avoidance.

In a first aspect, there is provided a terminal device. The terminal device comprises at least one processor; and at least one memory including computer program codes; the at least one memory and the computer program codes are configured to, with the at least one processor, cause the terminal device at least to obtain, from an application layer of the terminal device, at least one UL data to be transmitted to a network device, the at least one UL data comprising one or more application retransmission data and keep the one or more application retransmission data in a buffer of the terminal device for respective time intervals; and in accordance with a determination that an indication, that respective acknowledges are received for at least a portion of application retransmission data in the one or more application retransmission data, is received from the application layer, remove the portion of application retransmission data from the buffer.

In a second aspect, there is provided a method. The method comprises obtaining, from an application layer of a terminal device, at least one UL data to be transmitted to a network device, the at least one UL data comprising one or more application retransmission data and keeping the one or more application retransmission data in a buffer of the terminal device for respective time intervals. The method further comprises in accordance with a determination that an indication, that respective acknowledges are received for at least a portion of application retransmission data in the one or more application retransmission data, is received from the application layer, removing the portion of application retransmission data from the buffer.

In a third aspect, there is provided an apparatus comprising means for obtaining, from an application layer of a terminal device, at least one UL data to be transmitted to a network device, the at least one UL data comprising one or more application retransmission data; means for keeping the one or more application retransmission data in a buffer of the terminal device for respective time intervals; and means for, in accordance with a determination that an indication, that respective acknowledges are received for at least a portion of application retransmission data in the one or more application retransmission data, is received from the application layer, removing the portion of application retransmission data from the buffer.

In a fourth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
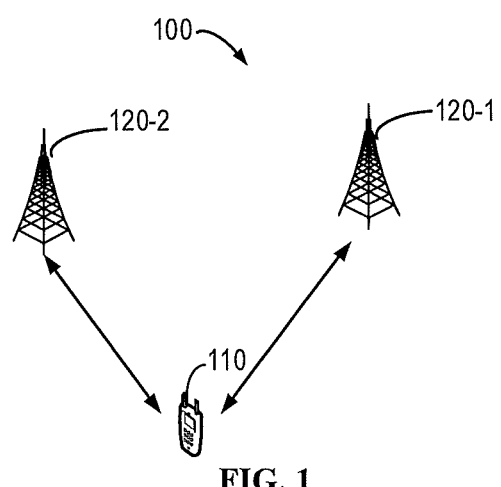
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110. Hereinafter the terminal device 110 may also be referred to as a UE 110. The communication network 100 may further comprise network devices 120-1 and 120-2. Hereinafter the network devices 120-1 may also be referred to as a first Radio Access Network (RAN) node 120-1, while the network devices 120-2 may also be referred to as a second RAN node 120-2. Furthermore, the network devices 120-1 and 120-2 may also be referred to as a RAN node 120 collectively.

The network devices 120-1 and 120-2 may communicate with each other. The network devices 120-1 and 120-2 may also communicate with the terminal device 110 respectively.

In some scenarios, the communication network 100 may refer to an NTN and the network device may be implemented in a satellite and moves along with the satellite. In some other scenarios, the communication network 100 may also refer to any other suitable networks.

It is to be understood that the number of network devices and terminal devices shown in FIG. 1 is given for the purpose of illustration without suggesting any limitations. The communication network 100 may include any suitable number of network devices and terminal devices.

The NTN have been defined for NR and NB-IoT/eMTC and a new scenario "Store-and-forward (S&F)" for IoT NTN has been proposed for the study item of NR and NB-IoT/eMTC over NTN.

The S&F may allow a satellite to provide service to IoT NTN devices even in periods/areas when/where the satellite is not connected to a Gateway (GW) on the ground. A RAN node on board architecture and a non-simultaneous operation of the service link and the feeder link are assumed. The messages may be stored on board until there is line of sight with the GW.

The S&F operation may refer to a discontinuous coverage scenario, where the UE may only occasionally and temporarily have coverage from a satellite. It is also possible that the discontinuous coverage scenario may be expanded with defining that the satellite is not always connected with the Core Network (CN). Hereinafter the RAN node may be referred to as an eNB, a gNB or any other suitable RAN nodes.

The store and forward architecture may enable a low-cost deployment consisting of just a few satellites and a few ground stations. That is, the connectivity cost per device can be further reduced at the cost of only being able to support delay tolerant data. The duration between a satellite connecting with the GW/CN may be hours or even days. For example, a first satellite may connect with GW/CN on Monday and the next connection between the first satellite and GW/CN may happen on Tuesday.

In NTN, the CN may use cells which are fixed to earth. If a one-to-one mapping from satellite to one of those cell areas may not be achieved, the network may not determine which satellite will cover a certain cell and send or receive data to/from the UE. In this situation, the network may not be aware of the data that has been delivered to the UE by the previous satellite passing by and the UE may not know whether the delivered data has been received by the CN either when a next satellite flies over.

For example, in a communication network 100, in a case where network devices 120-1 and 120-2 are implemented in different satellites, the network devices 120-1 and 120-2 may serve a UE located in a same cell but at different time. In some scenario, a network device on a satellite, for example the network device 120-2, may only serve part of the cell, which may or may not serve the UE.

In the situation as descried above, if the UE application triggers retransmission after Radio Resource Control (RRC) connection Release or in a RRC connected mode, while the packet is still on the way to be delivered to the CN. In this case the same Packet Data Convergence Protocol-Service Data Unit (PDCP-SDU) will be given to Access Stratum (AS) again. Similar issue exists in the other direction. The problem is, the application may retransmit PDCP-SDU for the buffered packet. However, the buffered packet may be on the way to the destination and the Acknowledge (ACK) for this packet may be expected, which may cause the UL data duplication and therefore the UL resource may be wasted.

Therefore, the present disclosure provides solutions of UL data duplication avoidance. In this solution, the UE may receive at least UL data to be transmitted to a RAN node, with which the UE is connected. The at least UL data may comprise one or more application retransmission data received from the application layer of the UE. The UE may keep the one or more application retransmission data for respective time intervals in the buffer of the UE. After the UE knows that ACKs have been received for at least a portion of application retransmission data, the UE may remove the portion of application retransmission data from the buffer. In this way, the UE may not perform an UL transmission until ACKs have been received by the application layer and processed by the application layer and therefore redundant retransmission of UL application data may be avoided.

Principle and implementations of the present disclosure will be described in detail below with reference to FIG. 2. which shows a signaling chart illustrating a process 200 of UL data duplication avoidance according to some example embodiments of the present disclosure. For the purpose of discussion, the process 200 will be described with reference to FIG. 1. The process 200 may involve the UE 110 and the RAN node 120. More specifically, the process may involve the application layer 110-1, the higher layer 110-2 and the RAN node 120.

Figure 2:
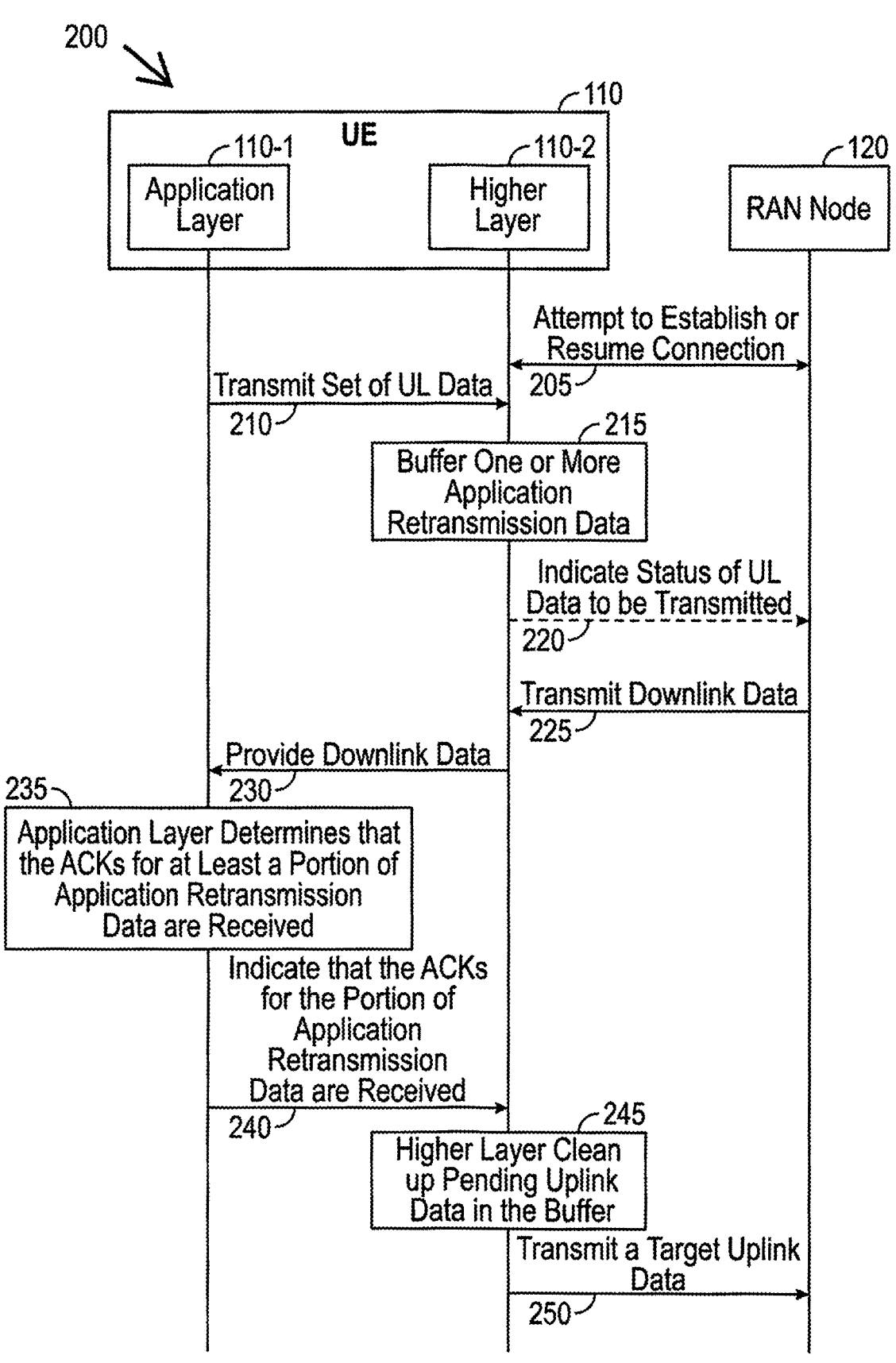
FIG. 2 shows a signaling chart illustrating a process of UL data duplication avoidance according to some example embodiments of the present disclosure.

As shown in FIG. 2, after detecting that a satellite flies over, on which the RAN node 120 is carried, the UE 110 may attempt 205 to establish or resume a connection with the RAN node 120. In some scenarios, the UE 110 and the RAN node 120 may be operated in an NTN with a S&F mode.

After the higher layer 110-2 is connected to RAN node 120 successfully, the application layer 110-1 may transmit 210 a set of UL data, which the application layer 110-1 intents to be transmitted to the RAN node 120, to the higher layer 110-2 of the UE 110. Hereinafter the higher layer 110-2 may refer to a PDCP layer. The set of UL data transmitted from the application layer 110-1 to the higher layer 110-2 may refer to UL PDCP SDUs/PDUs.

The set of UL data, transmitted from the application layer 110-1 to the higher layer 110-2, may comprises new transmission data and retransmission data, which may be identify by the application layer 110-1.

For example, the set of UL data may comprise one or more application retransmission data, which have been transmitted, for example, in last access of UE 110. In some scenarios, if the application data has been transmitted to the RAN node 120, and the application layer 110-1 has not receive from the RAN node 120 for the application data, then the application layer 110-1 may intent to retransmit the application.

After receiving the set of UL data, the higher layer 110-2 may buffer 215 one or more application retransmission data without performing an uplink transmission. For example, for each application retransmission data, the higher layer 110-2 may keep it in the buffer for a time interval. That is, the application retransmission data will not be transmitted before the time interval expires.

For example, the higher layer 110-2 may receive a configuration of a time duration from the RAN node. The time duration may correspond to a time in which the ACK for application data can be expected. More specifically, in the NTN S&F mode, the time may refer to the satellite to get to the GW and the data to the server end and the way back to the UE 110.

The higher layer 110-2 may buffer one or more application retransmission data for respective time intervals, which may be determined by the configuration of the time duration received from the RAN node. As an option, when the application layer 110-1 transmit the application retransmission data to the higher layer 110-2, the application layer 110-1 may indicate when the application retransmission data were transmitted in previously uplink transmission. The higher layer 110-2 may determine the time interval for buffering the application retransmission data based on the time duration configured by the RAN node and the time when the application retransmission data were transmitted. As another option, the time interval for buffering the application retransmission data may also consider a margin, for example, a time for the application layer 110-1 to process ACK in a case where downlink transmission associated with the previously transmitted uplink data.

Alternatively or additionally, the UE 110 may indicate 220, to the RAN node 120, status of the set of UL data to be transmitted, for example, after the UE connected to the RAN node 120, or via a random-access message, such as Message3 (MSG3) in a random access process. Moreover, if the UE 110 transmits the status of the set of UL data via the MSG3, the RAN node 120 may push the UE 110 back to idle mode if no data is to be transmitted, since the RAN node 120 may know that the corresponding ACK are on the way in for instance a next satellite.

The UL data may be mapped to a PDCP Segment Numbers (SN). The application retransmission data may be mapped to a same PDCP SN that was used when the application data was previously transmitted. In some example embodiments, the UE 110 may indicate, to the RAN node 120, respective PDCP SNs of the set of UL data. Then the RAN node may be aware of the application retransmission data in the set of UL data.

After connecting with the UE 110, the RAN node 120 may be aware of which uplink data previously transmitted from the UE 110 has been already picked up by another satellite and the ACK for the/these uplink data is on the way, because the RAN node is implemented on a satellite. That is, the RAN node 120 may know which uplink data previously transmitted from the UE 110 are expected to receive ACK (s). Therefore, the RAN node may determine which uplink data need to be transmitted if the RAN node 120 receives status of the set of UL data to be transmitted from the UE 110.

Then the RAN node 120 may first schedule downlink transmission for the uplink data previously transmitted from the UE 110 for which the ACKs are expected. As shown in FIG. 2, the RAN node 120 may transmit 225 downlink date to the UE 110. After receiving the downlink data, the higher layer 110-2 may provide 230 the downlink data to the application layer 110-1, to cause the application layer 110-1 to confirm whether the ACKs for at least a portion of application retransmission data are received.

If the application layer 110-1 determines 235 that the ACKs for at least a portion of application retransmission data are received, the application layer 110-1 may indicate 240, to the higher layer 110-2, that the ACKs for the portion of application retransmission data are received.

For example, If the application layer 110-1 receives ACKs, the application layer 110-1 may map the ACKs for the application retransmission data, which may indicate AS to purge the corresponding application retransmission data for which the ACKs are received and avoid retransmission of these corresponding application retransmission data.

If the higher layer 110-2 determines that ACKs for a portion of application retransmission data, the higher layer 110-2 may clean-up 245 the pending uplink data in the buffer, for example, by removing the corresponding application retransmission data, for which the ACKs are received, from the buffer.

It is possible that the potential uplink transmission from the UE 110 may not be performed until the ACKs for the application retransmission data received and processed by the application layer 110-1, which may cause the order of UL PDCP SDUs/PDUs transmissions to be changed.

The RAN node 120 may resume uplink scheduling after the corresponding application retransmission data are cleaned up. The UE 110 may transmit 250 a target uplink data to the RAN node 120. The target uplink data may be selected from the buffer after the corresponding application retransmission data has been removed from the buffer.

Furthermore, the higher layer 110-2 may also indicate the application layer to clear the target uplink data which are delivered to CN as per the status received from the RAN node 120.

With the solution of the present disclosure, the downlink application data may be scheduled first before the opportunity for the uplink transmission of the UE. In this way, redundant retransmission of UL application data may be avoided.

Furthermore, the order of the UL PDCP SDUs/PDUs transmissions may be changed, if the UE is configured in S&F mode, resulting in PDCP SNs, which are not even received at RAN node in earlier attempt, to be scheduled earlier than packets which were ACKed by the RAN node to allow DL transmission first for those.

Figure 3:
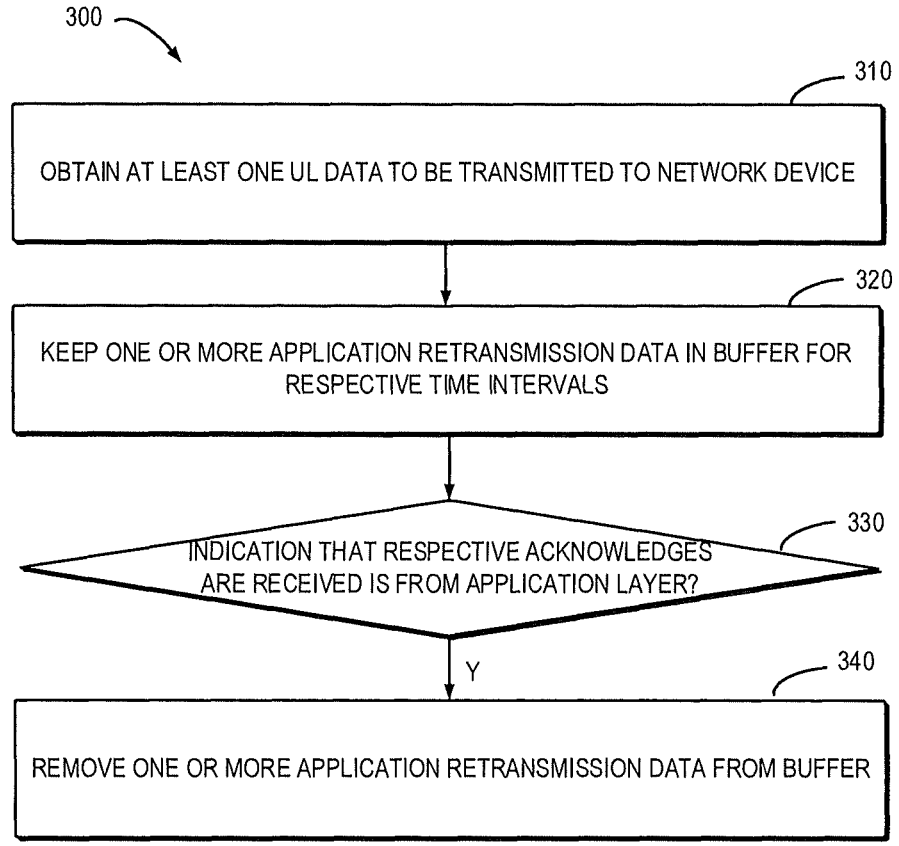
FIG. 3 shows a flowchart of an example method of UL data duplication avoidance according to some example embodiments of the present disclosure.

FIG. 3 shows a flowchart of an example method 300 of UL data duplication avoidance according to some example embodiments of the present disclosure. The method 300 can be implemented at the terminal device 110 as shown in FIG. 1. For the purpose of discussion, the method 300 will be described with reference to FIG. 1.

At 310, the terminal device obtains, from an application layer of the terminal device, at least one uplink data to be transmitted to a network device, the at least one uplink data comprising one or more application retransmission data.

At 320, the terminal device keeps the one or more application retransmission data in a buffer of the terminal device for respective time intervals.

In some example embodiments, the terminal device may obtain a configuration of a time duration from network device and obtain from the application layer, respective time points that the one or more application retransmission data were transmitted. The terminal device may further determine the respective time intervals based on the respective time points and the time duration.

In some example embodiments, if the terminal device determines that at least one downlink data is received from the network device, the terminal device may provide the at least one downlink data to the application layer, to cause the application layer to determine whether respective acknowledges are received for at least a portion of application retransmission data.

At 330, if the terminal device determines an indication, that respective acknowledges are received for at least a portion of application retransmission data in the one or more application retransmission data, is received from the application layer, at 340, the terminal device removes the portion of application retransmission data from the buffer.

In some example embodiments, the terminal device may suspend an uplink transmission for the at least one uplink data until the respective acknowledges are received and processed by the application layer.

In some example embodiments, the terminal device may transmit, to the network device, a target uplink data selected from the buffer after removing the portion of application retransmission data from the buffer.

In some example embodiments, wherein the terminal device and the network device are operated in a Store-and-forward mode in a Non-Terrestrial Network.

In some example embodiments, an apparatus capable of performing the method 300 (for example, implemented at the UE 110) may comprise means for performing the respective steps of the method 300. The means may be implemented in any suitable form. For example, the means may be implemented in a circuitry or software module.

In some example embodiments, the apparatus comprises means for obtaining, from an application layer of a terminal device, at least one UL data to be transmitted to a network device, the at least one UL data comprising one or more application retransmission data; means for keeping the one or more application retransmission data in a buffer of the terminal device for respective time intervals; and means for, in accordance with a determination that an indication, that respective acknowledges are received for at least a portion of application retransmission data in the one or more application retransmission data, is received from the application layer, removing the portion of application retransmission data from the buffer.

In some example embodiments, the means for keeping the one or more application retransmission data in the buffer comprises means for obtaining, from the network device, a configuration of a time duration; means for obtaining, from the application layer, respective time points that the one or more application retransmission data were transmitted; and means for determining the respective time intervals based on the respective time points and the time duration.

In some example embodiments, the apparatus may also comprise means for, in accordance with a determination that the at least one downlink data is received from the network device, providing the at least one downlink data to the application layer, to cause the application layer to determine whether respective acknowledges are received for at least a portion of application retransmission data.

In some example embodiments, the apparatus may also comprise means for suspending an uplink transmission for the at least one uplink data until the respective acknowledges are received and processed by the application layer.

In some example embodiments, the apparatus may also comprise means for transmitting, to the network device, a target uplink data selected from the buffer after removing the portion of application retransmission data from the buffer.

In some example embodiments, wherein the terminal device and the network device are operated in a Store-and-forward mode in a Non-Terrestrial Network.

Figure 4:
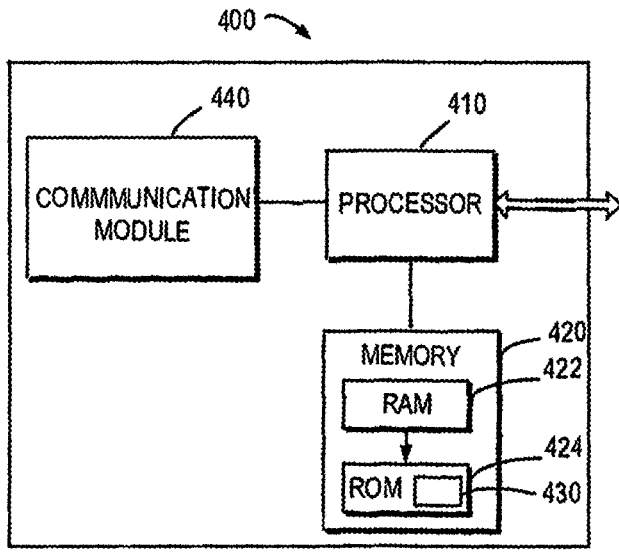
FIG. 4 shows a simplified block diagram of a device that is suitable for implementing example embodiments of the present disclosure.
Figure 5:
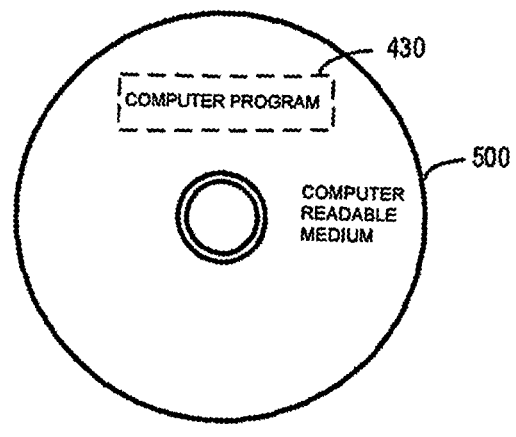
FIG. 5 shows a block diagram of an example computer readable medium in accordance with some embodiments of the present disclosure.

FIG. 4 is a simplified block diagram of a device 400 that is suitable for implementing embodiments of the present disclosure. The device 400 may be provided to implement the communication device, for example the UE 110 and the RAN node 120 as shown in FIG. 1. As shown, the device 400 includes one or more processors 410, one or more memories 440 coupled to the processor 410, and one or more communication modules 440 coupled to the processor 410.

The communication module 440 is for bidirectional communications. The communication module 440 has one or more communication interfaces to facilitate communication with one or more other modules or devices. The communication interfaces may represent any interface that is necessary for communication with other network elements. In some example embodiments, the communication module 440 may include at least one antenna.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random-access memory (RAM) 422 and other volatile memories that will not last in the power-down duration.

A computer program 430 includes computer executable instructions that are executed by the associated processor 410. The program 430 may be stored in the ROM 420. The processor 410 may perform any suitable actions and processing by loading the program 430 into the RAM 420.

The embodiments of the present disclosure may be implemented by means of the program 430 so that the device 400 may perform any process of the disclosure as discussed with reference to FIGS. 2 to 3. The embodiments of the present disclosure may also be implemented by hardware or by a combination of software and hardware.

In some example embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like. FIG. 6 shows an example of the computer readable medium 500 in form of CD or DVD. The computer readable medium has the program 430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
at least one processor; and
at least one non-transitory memory storing instructions that, when executed with the at least one processor, cause the terminal device at least to:
    obtain, from an application layer of the terminal device, at least one uplink data to be transmitted to a network device, the at least one uplink data comprising one or more application retransmission data;
    obtain, from the network device, a configuration of a time duration;
    obtain, from the application layer, respective time points when the one or more application retransmission data were transmitted;
    determine respective time intervals based on the respective time points and the time duration;
    keep the one or more application retransmission data in a buffer of the terminal device for the respective time intervals; and
    in accordance with a determination that an indication, that respective acknowledges are received for at least a portion of application retransmission data in the one or more application retransmission data, is received from the application layer, remove the at least the portion of application retransmission data from the buffer.

2. A method comprising:
obtaining, from an application layer of a terminal device, at least one uplink data to be transmitted to a network device, the at least one uplink data comprising one or more application retransmission data;
obtaining, from the network device, a configuration of a time duration;
obtaining, from the application layer, respective time points that the one or more application retransmission data were transmitted;
determining respective time intervals based on the respective time points and the time duration;
keeping the one or more application retransmission data in a buffer of the terminal device for the respective time intervals; and
in accordance with a determination that an indication, that respective acknowledges are received for at least a portion of application retransmission data in the one or more application retransmission data, is received from the application layer, removing the at least the portion of application retransmission data from the buffer.

3. A non-transitory program storage device readable with an apparatus, tangibly embodying a program of instructions executable with the apparatus for performing:
obtaining, from an application layer of a terminal device, at least one uplink data to be transmitted to a network device, the at least one uplink data comprising one or more application retransmission data;
obtaining, from the network device, a configuration of a time duration;
obtaining, from the application layer, respective time points that the one or more application retransmission data were transmitted;
determining respective time intervals based on the respective time points and the time duration;

keeping the one or more application retransmission data in a buffer of the terminal device for the respective time intervals; and in accordance with a determination that an indication, that respective acknowledges are received for at least a portion of application retransmission data in the one or more application retransmission data, is received from the application layer, removing the at least the portion of application retransmission data from the buffer.

\* \* \* \* \*